(No Model.)
R. KELLS.
TEST GAGE FOR SETTING CAR WHEELS.
No. 340,883. Patented Apr. 27, 1886.
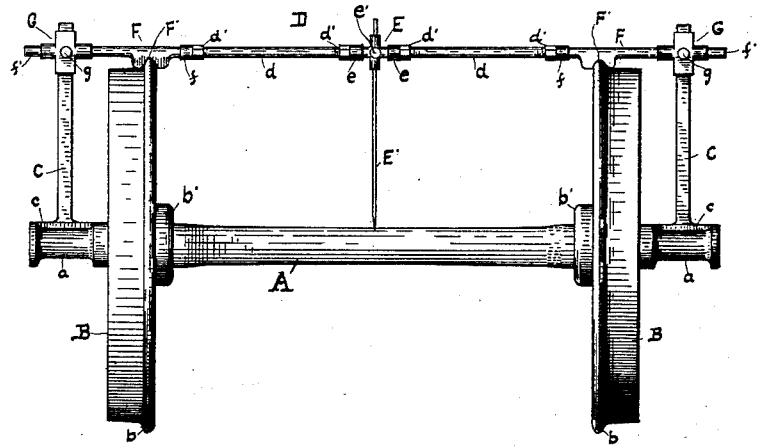
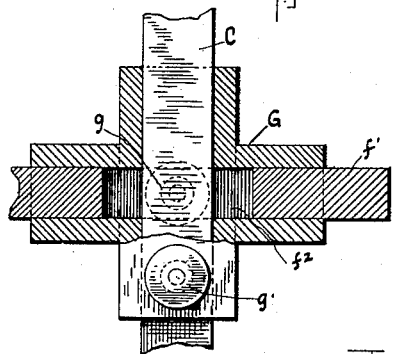
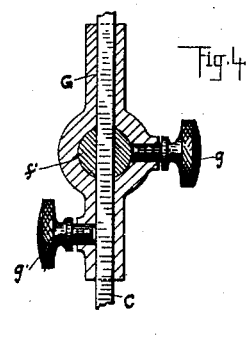
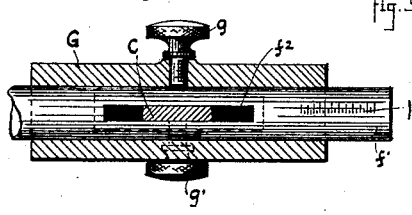
WITNESSES
N. S. Armstrong
Geo. W. King
Ross Kells   INVENTOR
By
Leggett & Leggett, Attorneys

UNITED STATES PATENT OFFICE.

ROSS KELLS, OF CLEVELAND, OHIO, ASSIGNOR TO THE PAIGE CAR WHEEL COMPANY, OF SAME PLACE.

TEST-GAGE FOR SETTING CAR-WHEELS.

SPECIFICATION forming part of Letters Patent No. 340,883, dated April 27, 1886.

Application filed February 4, 1886. Serial No. 190,849. (No model.)

*To all whom it may concern:*

Be it known that I, ROSS KELLS, of Cleveland, in the county of Cuyahoga and State of Ohio, have invented certain new and useful Improvements in Test-Gages for Setting Car-Wheels; and I do hereby declare the following to be a full, clear, and exact description of the invention, such as will enable others skilled in the art to which it pertains to make and use the same.

My invention relates to an improved gage for testing more especially the position of car-wheels on the axle, in which templets are made to fit respectively the journal-bearings and wheel-flanges, to the end that not only the distance apart of the flanges is indicated, but also the positions of the wheels endwise on the axle are shown.

Heretofore the manner of preparing car wheels and axles and of setting the former upon the lathe usually has been substantially as follows: In turning the axle the journal-bearings were made of standard size, length, and distance apart, and the axle was marked, usually, with a prick-punch for setting the wheels, such marks being supposed to be placed at given distances from the journal-bearings, and where the inner ends of the wheel-hubs should come. The car-wheel, when chucked for boring, is "trued up" from the face of the flange; but the inner end of the hub, that is to govern the setting of the wheel, is assumed to be correct, and is therefore not faced off or trued up in any manner. In a majority of cases the hubs are approximately accurate, and the finished work will consequently be substantially in line, providing the marks for setting the wheel have been carefully made; but it frequently occurs that one of the hubs is faulty in length, and when the wheels are set the flanges do not correspond with the gage, in which case a wheel (with an even chance that it be the wrong wheel) is moved to bring the flanges to the gage, and the work is turned out as perfect, and with the gages heretofore used for measuring the distance apart of the flanges there was nothing to determine if the faces of the respective flanges were of equal distance from the respective journal-bearings. As a result of such practice, "every now and then" a wheel is condemned and the axle and wheels removed at a great loss, because, the wheels not being in line with the other wheels of the car, one wheel had crowded the track and the flange thereof had soon been worn so as to render it unsafe. In view of these difficulties, I have devised a gage that will not only gage the distance between the face of the flanges, but will indicate the exact location of each wheel on the axle.

In the accompanying drawings, Figure 1 is a side elevation of my improved gage, showing the same in position for testing car wheels and axles. Figs. 2, 3, and 4 are enlarged sections in detail, the first being vertical and longitudinal, the second horizontal, and the last transverse.

A represents a car-axle of an ordinary variety, having journal-bearings a. Upon the axle are mounted the wheels B, the latter having flanges b and hubs b', the latter usually projecting on the inside of the wheels.

C are metal bars, usually made flat and thin, with templets c on the respective ends thereof, the said templets being made to fit nicely between the shoulders of the journal-bearings, as shown in Fig. 1. The bars C are connected by a cross-bar, D, the latter having notches F', that engage the flanges b of the wheels. Now, it is evident that when the templets c fit in the journal-bearings a and the flanges b fit in the notches F' the work must be perfect, and that any inaccuracy in setting the wheels will, by means of such a gage, be at once detected, and in such a manner that the error may be remedied.

As several sizes of car-wheels are likely to be used, the rods C should be adjustable endwise to regulate the length of the same, and as the wheels may be set at various distances apart, according to the width of the track, and to suit the notion of the master mechanic as to clearance, the bars D must be adjusted in length. To this end the arrangement is as follows: The cross-bar D is preferably made in pieces, the rods d screwing into sockets e of the cross E and into sockets f of the parts F, with suitable jam-nuts, d'. A pointer, E', is secured in the cross E by means of the thumb-screw e'. This pointer is to indicate the center of the axle, and may be adjusted lengthwise as desired. The parts F have respectively notches F', that fit the flanges b of the wheels, and the outer ends, f', pass, respectively, through the crosses G, and are secured by the thumb-screws g. The parts f' have slots $f^2$ (shown more clearly in Fig. 3) for the passage of the rods C. Thumb-screws g' engage the bars C, as shown in Fig. 4. A scale, 1, (see Fig. 3,) may be marked on the parts f' for setting the crosses G.

In manufacturing car-wheels and axles, usually, a goodly number of one kind are made up, and the tools are arranged accordingly. The rod D is adjusted in length to bring the notches F' a suitable distance apart to fit the flange b of a standard set of wheels. The crosses G are adjusted to bring the templets c over the axle-bearing a, and the bars C are adjusted in the crosses to the required length, so that with the notches F' resting on the flanges b the templets c will fit between the shoulders of the journal-bearing a. When the gage has been thus adjusted with accuracy and the thumb-screw and jam-nuts set to hold the parts rigid, the operator has an accurate test-gage for the different parts of the work, to wit: The templets c will show if the journal-bearings are the right distance apart and if respectively of the standard length, and such tests may be taken before or after the wheels are placed upon the axle. After the wheels are set, by applying the gage, if the position of the wheels on the axle is correct, the flanges b will fit the notches F. If the wheels are not set properly, the relative positions of the notches F and flanges b will indicate what movement on the axle of either or both wheels will be necessary to bring the position of the wheels to the standard.

What I claim is—

In a test-gage for setting car-wheels, the combination, with the templets or plates arranged to fit, respectively, between the shoulders of the journal-bearings of a car-axle, of notched plates arranged to fit, respectively, on the wheel-flanges when the latter are secured at the standard distance apart, and a suitable connecting-frame for holding the notched plates and templets rigidly, substantially as set forth.

In testimony whereof I sign this specification, in the presence of two witnesses, this 1st day of February, 1886.

ROSS KELLS.

Witnesses:
CHAS. H. DORER,
GEO. W. KING.